Sept. 29, 1959 A. A. WOLF 2,906,963

POLYPULSE GENERATOR

Filed Sept. 29, 1955

INVENTOR.
ALFRED A. WOLF
BY
ATTORNEYS

United States Patent Office 2,906,963

Patented Sept. 29, 1959

2,906,963

POLYPULSE GENERATOR

Alfred A. Wolf, Philadelphia, Pa.

Application September 29, 1955, Serial No. 537,602

3 Claims. (Cl. 331—144)

(Granted under Title 35, U.S. Code (1952), sec. 266)

The invention described herein may be manufactured and used by or for the Government of the United States of America for governmental purposes without the payment of any royalties thereon or therefor.

The present invention relates to a polypulse generator and more particularly to a generator which is capable of generating selectively a multiple range of pulses, from very short to very large pulse lengths, at selective repetition rate with simple controls.

Present arrangements for generators capable of selecting the repetition rate and pulse length consist generally of providing additional circuit elements and switching means to change pulse circuit constants. These arrangements provide only narrow ranges, and are costly in requiring various alternate circuits for choosing the selected pulse timing.

The arrangement of this invention utilizes a simple two tube circuit forming a self-starting type of oscillating circuit which in its very design is flexible and permits by a compact control the provision of pulses over a range which is wide and flexible. The electron tubes are joined together asymmetrically and conduct alternatively in sequence. An RC circuit between ground and the control grid of one tube regulates the decay of voltage on the grid and thereby the length of pulse. The second tube is provided with a variable capacitor across the control grid and cathode so that the internal resistance of the tube combined with the variable capacitor forms a second RC network which regulates the discharge of a condenser placed between the plate of the first tube and the control grid of the second tube. The time constant of this RC combination determines the interval of time over which the second tube will conduct and the first tube will remain below its cut-off point, and thereby the spacing between pulses delivered by the latter.

Thus, it is an object of the present invention to provide a simple circuit capable of providing a wide range of pulse length and repetition rate.

Another object is to provide a two tube self-starting oscillating circuit having the ability to provide selectively a wide range of pulse length and repetition rate.

A further object of the invention is the provision of a pulse generator simple in construction and capable of providing either a selected pulse length or a selected pulse repetition rate.

A final object of the present invention is the provision of a pulse generator utilizing a two tube self-starting oscillating circuit including a single element capacitance control which shortens pulse length by increasing the capacity of the capacitance rather than decreasing it, as in devices already known.

Figure 1:
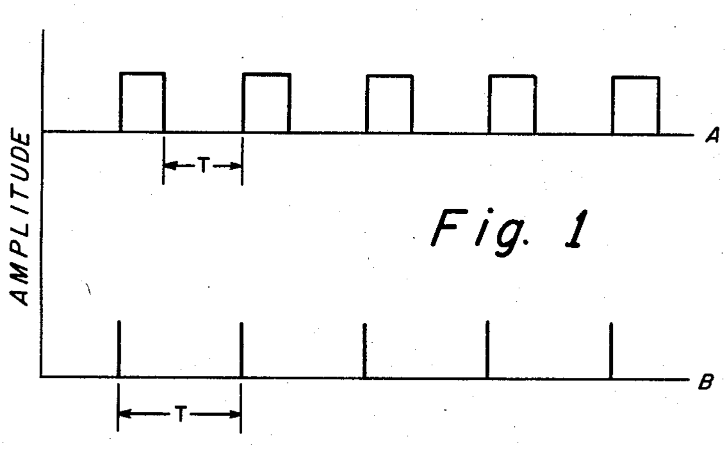
Figure 2:
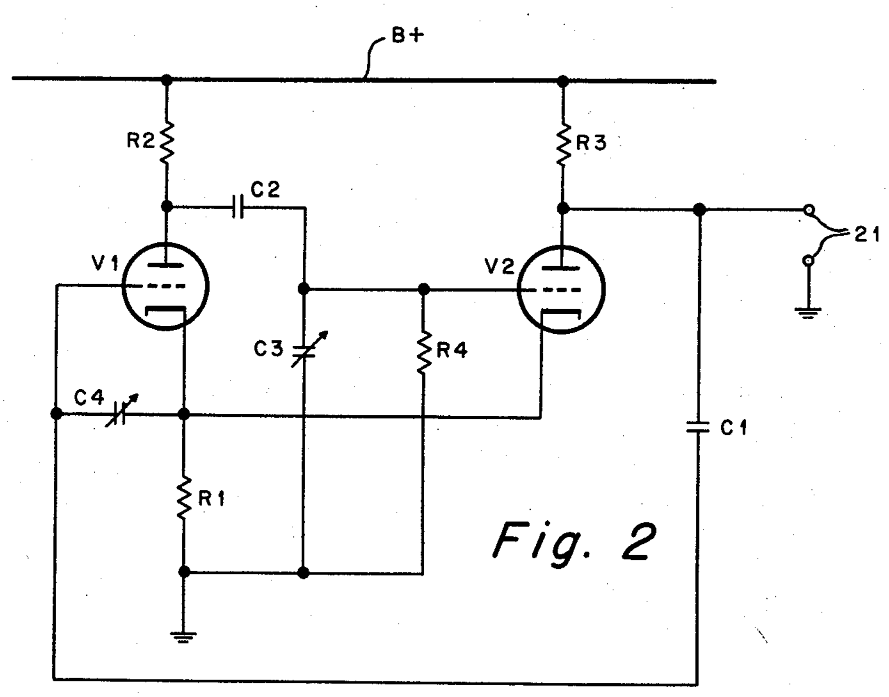

The exact nature of this invention as well as other objects and advantages thereof will be readily apparent from consideration of the following specification relating to the annexed drawing in which:

Fig. 1 illustrates graphically a typical range of pulse lengths which may be selected; and Fig. 2 shows a general circuit diagram illustrating the principles of this invention.

Referring to the drawings wherein like reference characters designate like or corresponding parts throughout the several views, there is shown in Fig. 1 a pair of graphs A and B showing respectively a series of wide pulses of the order of 300 milliseconds and narrow pulses of the order of 0.1 microsecond. T is the time between pulses which may be varied by the device of the instant invention. The pulse length can be varied continuously over an extremely wide range.

Fig. 2 shows a pair of triodes $V_1$ and $V_2$ having a common cathode connection through resistance $R_1$ to ground. Tube $V_1$ is connected to the B+ power supply through resistance $R_2$ while triode $V_2$ is connected to B+ through resistance $R_3$. The grid of $V_1$ is connected through capacitor $C_1$ to the anode of $V_2$. The plate or anode of $V_1$ is connected through capacitor $C_2$ and variable capacitor $C_3$ to ground. The grid of $V_2$ is connected to a point between capacitors $C_2$ and $C_3$. Also tied at this point is a resistor $R_4$ connected to ground. A variable capacitor $C_4$ may be connected between the grid and cathode of $V_1$. The output of the circuit may be taken from leads 21.

The operation of the arrangement of Fig. 2 is as follows: Assume that as the circuit warms up, a positive signal appears on the grid of $V_1$. This signal is amplified through the tube $V_1$ and the voltage on the plate drops accordingly since resistor $R_2$ is connected to B+. The grid voltage on $V_2$ is thereby caused to fall and this drop is amplified through that tube. The plate voltage of tube $V_2$ rises since resistor $R_3$ is connected between the plate of $V_2$ and the constant voltage source B+. This process continues until $V_1$ is fully on and $V_2$ is completely cut off. At this point, $C_1$ is charged to a B+ value since no current is flowing through $R_3$. Capacitor $C_1$ cannot discharge except through the leakage resistance of tube $V_1$, and this takes T seconds shown in the diagram of Fig. 1. As $C_1$ discharges slowly, the grid voltage of $V_1$ falls. This fall is amplified through $V_1$ and the plate voltage thereby rises. When the potential of the plate of $V_1$ rises sufficiently to bring the grid voltage of $V_2$ up to cut-off condition, $V_2$ turns on and generates a pulse, such as one illustrated in Fig. 1. Condition in tube $V_2$ drops the voltage on the plate of $V_2$ causing an appropriate voltage decrease on the grid of $V_1$ which thereby cuts off $V_1$ when the grid voltage drops below its cut-off point. While $V_2$ conducts and tube $V_1$ is cut off, condenser $C_2$ is exposed to the full B+ voltage, as is also the grid of $V_2$. It will be noted that condenser $C_2$ and the grid of tube $V_2$ are grounded through condenser $C_3$ and $R_4$ in parallel, permitting the gradual decay of voltage on the grid of tube $V_2$. It is the time constant of this RC combination as $C_2$ discharges and of the RC circuit of $R_4$ with $C_2$ and the grid-cathode capacitance of tube $V_2$ which determine when the voltage on the grid $V_2$ will drop to cut-off point, thus terminating conduction through $V_2$. This action is not fully understood as yet, since the adjustment of condenser $C_3$ in the direction of increasing capacitance has the result of shortening the length of pulses. This is in contrast to other arrangements wherein making a capacitor smaller brings the pulse length down. In such arrangements, size of the capacitor is a limiting factor for small pulse length. In the device described herein there is no such limit based on capacitor size because there is no inherent outside limit on the size of a condenser. Therefore, adjustment of condenser $C_3$ determines for how long a period tube $V_2$ will conduct, or the length of the pulse shown in Fig. 1. When the voltage on the grid of $V_2$ drops to the cut-off point, condenser $C_1$ will again be exposed to the B+ voltage and the grid voltage of tube $V_1$ likewise exposed to this voltage thereby permitting conduction in tube $V_1$. The condenser $C_4$ across the cathode and the grid of tube $V_1$ forms with the resistance between the grid and the cathode of the tube an RC circuit having a high time constant. This, therefore, controls the rate of discharge of condenser $C_1$ through the tube $V_1$. By controlling the capacitance of $C_4$ it is possible to control the time between pulses, or the repetition rate.

It is thus seen that there has been described a relatively simple oscillator circuit capable of producing with simple and flexible control a wide range of pulses ranging down to extremely short pulse lengths and at the same time any selected reception rate or interval between pulses. Of course, the specific embodiment just described may be altered without deviating from the principle of the invention since the substitution or addition of expedients in the art is contemplated, such as, for example, substituting pentodes for the triodes illustrated, or taking the output from the plate of tube $V_1$ instead of tube $V_2$.

Since certain changes in my invention may be made without departing from the spirit and scope thereof, it is intended that all matters contained in the foregoing description and shown in the accompanying drawing shall be interpreted as illustrative and not in a limiting sense.

What is claimed is:

1. A free-running polypulse generator circuit comprising first and second electron tubes each provided with an anode, a grid, and a cathode, a source of positive voltage supply and a resistor for and connected between each of said anodes and said source, said supply voltage exceeding the grid cut-off voltage of both of said tubes, a resistor connected between ground and both of said cathodes, capacitive means connected between said first tube anode and said second tube grid for applying said supply voltage to said second tube grid when said first tube is non-conducting, thereby rendering said second tube conducting, means comprising a resistive path and a capacitive path in parallel between said second tube grid and ground for determining the length of time it takes for the voltage on said second tube grid to drop below cut-off point due to discharge through said parallel path means thereby terminating conduction through said second tube, capacitive means connected between said anode of said second tube and said first tube grid for applying said supply voltage to the latter said grid when said second tube is non-conducting to render said first tube conducting, and further capacitive means connected between said grid and said cathode of said first tube forming therewith a resistive-capacitive time-constant network for regulating the discharge of said further capacitive means and hence the length of time it takes for said first tube grid voltage to drop below cut-off thereby rendering said first tube non-conducting.

2. A free-running polypulse generator circuit comprising first and second electron tubes each provided with an anode, a grid, and a cathode, a source of positive voltage supply and a resistor for and connected between each of said anodes and said source, said supply voltage exceeding the grid cut-off voltage of both of said tubes, a resistor connected between ground and both of said cathodes, capacitive means connected between said first tube anode and said second tube grid for applying said supply voltage to said second tube grid when said first tube is non-conducting, thereby rendering said second tube conducting, means comprising a resistive path and a capacitive path in parallel between said second tube grid and ground for determining the length of time it takes for said voltage on said second tube grid to drop below said cut-off point due to discharge through said parallel path means thereby terminating conduction through said second tube, means included in said capacitive path for adjusting the capacitance thereof for regulating the length of time said second tube remains conducting, capacitive means connected between said anode of said second tube and said first tube grid for applying said supply voltage to the latter said grid when said second tube is non-conducting to render said first tube conducting, and further capacitive means connected between said grid and said cathode of said first tube forming therewith a resistive-capacitive time-constant network for regulating the discharge of said further capacitive means and hence the length of time it takes for said first tube grid voltage to drop below cut-off thereby rendering said first tube non-conducting.

3. The polypulse generator circuit of claim 2 in which adjustment of said capacitive adjusting means in the direction of increasing capacitance has the effect of shortening the time of second tube conduction.

References Cited in the file of this patent

UNITED STATES PATENTS

| | | |
|---|---|---|
| 2,470,028 | Gordon | May 10, 1949 |
| 2,633,535 | Daskam | Mar. 31, 1953 |
| 2,639,385 | Augustadt | May 19, 1953 |

FOREIGN PATENTS

| | | |
|---|---|---|
| 572,214 | Great Britain | Sept. 10, 1945 |

UNITED STATES PATENT OFFICE

CERTIFICATE OF CORRECTION

Patent No. 2,906,963 September 29, 1959

Alfred A. Wolf

It is hereby certified that error appears in the printed specification of the above numbered patent requiring correction and that the said Letters Patent should read as corrected below.

Column 2, line 44, for "Condition" read -- Conduction --.

Signed and sealed this 16th day of August 1960.

(SEAL)

Attest:

KARL H. AXLINE
Attesting Officer

ROBERT C. WATSON
Commissioner of Patents